United States Patent
Kay et al.

(10) Patent No.: US 10,681,420 B2
(45) Date of Patent: *Jun. 9, 2020

(54) DIGITAL CONTENT DELIVERY SYSTEM TRANSACTION ENGINE

(76) Inventors: Richard W. Kay, Troutdale, OR (US); Gregory B. Temkin, Portland, OR (US); Matthew L. Olson, Vancouver, WA (US); David J. Hendrickson, Powell Butte, OR (US)

( * ) Notice: Subject to any disclaimer, the term of this patent is extended or adjusted under 35 U.S.C. 154(b) by 577 days.

This patent is subject to a terminal disclaimer.

(21) Appl. No.: 11/855,763

(22) Filed: Sep. 14, 2007

(65) Prior Publication Data

US 2008/0005760 A1 Jan. 3, 2008

Related U.S. Application Data

(63) Continuation of application No. 09/823,218, filed on Mar. 29, 2001, now Pat. No. 7,272,842.

(51) Int. Cl.
*H04N 21/214* (2011.01)
*H04N 21/2543* (2011.01)
*H04N 21/472* (2011.01)
*H04N 21/6587* (2011.01)
*H04N 21/478* (2011.01)
*H04N 21/258* (2011.01)
*H04N 21/4784* (2011.01)
*G06Q 30/04* (2012.01)
*H04N 7/173* (2011.01)

(52) U.S. Cl.
CPC ....... *H04N 21/47202* (2013.01); *G06Q 30/04* (2013.01); *H04N 7/17336* (2013.01); *H04N 21/2143* (2013.01); *H04N 21/25435* (2013.01); *H04N 21/25891* (2013.01); *H04N 21/478* (2013.01); *H04N 21/4781* (2013.01); *H04N 21/4784* (2013.01); *H04N 21/6587* (2013.01)

(58) Field of Classification Search
CPC .... H04N 21/2143; H04N 7/161; H04N 7/162; H04N 7/163; H04N 7/164; H04N 21/47202; H04N 21/436; H04N 21/43615; H04N 21/4363; H04N 21/43632; H04N 21/43635; H04N 21/43637
USPC .................... 725/28, 1, 78, 82, 87
See application file for complete search history.

(56) References Cited

U.S. PATENT DOCUMENTS

| | | | |
|---|---|---|---|
| 4,987,486 A * | 1/1991 | Johnson et al. | 725/131 |
| 5,521,631 A | 5/1996 | Budow et al. | |
| 5,724,521 A | 3/1998 | Dedrick | |
| 5,758,257 A * | 5/1998 | Herz et al. | 725/116 |
| 5,838,314 A | 11/1998 | Neel et al. | |
| 5,935,206 A | 8/1999 | Dixon et al. | |
| 5,956,716 A * | 9/1999 | Kenner | G06F 17/30017 |
| 6,009,465 A | 12/1999 | Decker et al. | |

(Continued)

*Primary Examiner* — Ngoc K Vu
(74) *Attorney, Agent, or Firm* — J. Curtis Edmondson; Law Offices of J. Curtis Edmondson

(57) ABSTRACT

A system for delivering digital content on demand in a multiple unit environment includes a server local to the multiple unit environment. The server stores, in its memory, the digital content, and is capable of supporting multiple simultaneous asynchronous accesses to the digital content. A billing system tracks the bill for each unit in the multiple unit environment, based on the accessed digital content. Within each unit that supports access to the digital content, an access system (preferably a set-top box) allows a user to access the digital content.

9 Claims, 17 Drawing Sheets

(56) References Cited

U.S. PATENT DOCUMENTS

| | | | |
|---|---|---|---|
| 6,133,912 A * | 10/2000 | Montero | G06Q 30/02 |
| | | | 715/716 |
| 6,134,549 A | 10/2000 | Regnier et al. | |
| 6,157,377 A * | 12/2000 | Shah-Nazaroff | ............................ |
| | | | H04N 7/17318 |
| | | | 348/E7.071 |
| 6,189,008 B1 | 2/2001 | Easty et al. | |
| 6,289,314 B1 | 9/2001 | Matsuzaki et al. | |
| 6,434,747 B1 * | 8/2002 | Khoo et al. | 725/46 |
| 6,530,086 B1 | 3/2003 | Brodigan | |
| 6,539,548 B1 * | 3/2003 | Hendricks | H04H 20/42 |
| | | | 348/E5.002 |
| 6,690,391 B1 * | 2/2004 | Proehl et al. | 715/720 |
| 6,898,762 B2 | 5/2005 | Ellis et al. | |
| 2001/0014975 A1 | 8/2001 | Gordon et al. | |
| 2002/0124249 A1 | 9/2002 | Shintani et al. | |
| 2002/0129358 A1 | 9/2002 | Buehl et al. | |
| 2002/0138744 A1 * | 9/2002 | Schleicher | H04L 63/0823 |
| | | | 713/187 |
| 2003/0149988 A1 * | 8/2003 | Ellis | H04N 5/44543 |
| | | | 725/87 |
| 2004/0261095 A1 | 12/2004 | Sezan et al. | |
| 2007/0127680 A1 * | 6/2007 | Forte | 379/218.01 |

\* cited by examiner

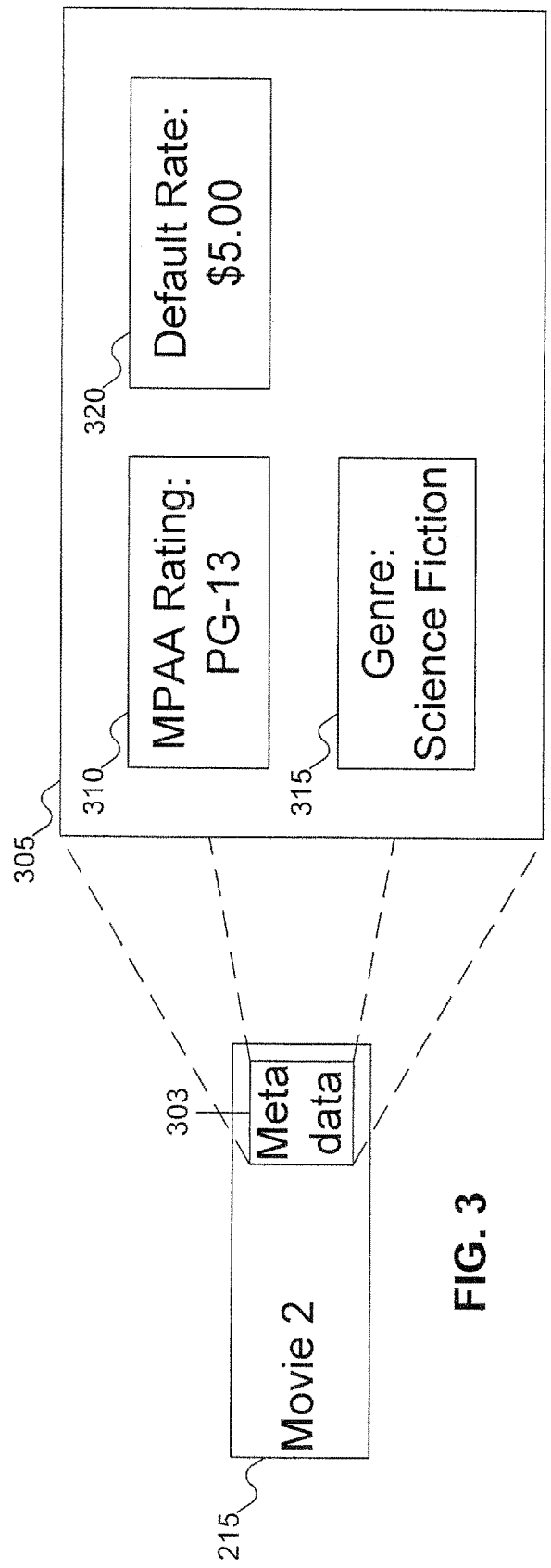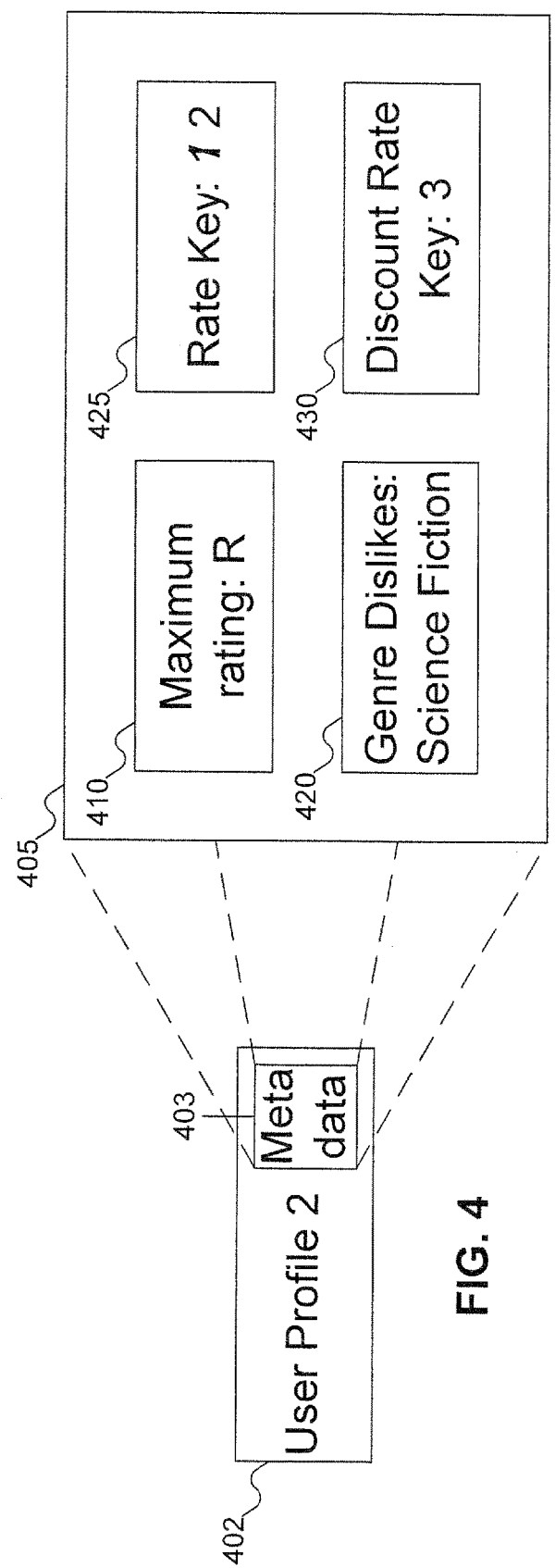

Custom Product Billing Rate Table 1505

| Rate Key 2 1515 | Movie 1 $5.00 1520-1 | Movie 2 $3.00 1520-2 | Video Game 2 $1.50 1520-3 | ... |
|---|---|---|---|---|
| ... | | | | |

| Product Discount Table | | |
|---|---|---|
| Discount Key 3 _1615_ | Movie 1 _1620-1_ | $0.50 |
| | Movie 2 _1620-2_ | 10% |
| | Video Game 2 _1620-3_ | $0.25 |
| ... | ... | |

DIGITAL CONTENT DELIVERY SYSTEM TRANSACTION ENGINE

CROSS REFERENCE TO RELATED APPLICATIONS

This application is a continuation of U.S. patent application Ser. No. 09/823,218, filed Mar. 29, 2001, now U.S. Pat. No. 7,272,842, issued Sep. 18, 2007, entitled DIGITAL CONTENT DELIVERY SYSTEM TRANSACTION ENGINE, the disclosure of which is herein incorporated by reference in its entirety.

FIELD OF THE INVENTION

This invention pertains to a digital content delivery system and, more particularly, to a system for delivering digital video on demand to users.

BACKGROUND OF THE INVENTION

As technology has progressed, many other industries have seen the advantages of the new technology. The hospitality industry is one of these industries. For example, many hotels now offer their guests recent movies, offered as a pay-per-view service.

But the current form of video-on-demand offered to guests is analog in nature. The movies are stored on videotape. This means that only one guest can watch an individual copy of a movie at a time. For the hotel to offer the same movie to several guests, the hotel needs several copies of the movie. And when all available copies of the movie are "checked out," the next guest has to wait for one of the used copies to become available.

Further, beyond when the movie starts (if a videotape is available), guests currently have no power to control the airing of the movie. For example, a guest might want to pause the movie to answer an important phone call or to run a quick errand. The analog technology used by the hospitality industry does not allow the guest that option. If the guest needs to turn his attention away from the movie and miss some of the show, the guest cannot recover the lost footage without ordering the movie a second time (and paying a second fee).

Accordingly, a need remains for a video-on-demand system that allows unlimited numbers of viewers and allows users individual control over the broadcast that addresses these and other problems associated with the prior art.

SUMMARY OF THE INVENTION

The invention is a system for delivering digital content on demand in a multiple unit environment. A server local to the multiple unit environment stores the digital content in memory and enables multiple simultaneous asynchronous accesses to the digital content. A billing system tracks the usage of the server and bills each individual unit based on the use of the digital content. Within the units, access systems enable the user to access the digital content.

The invention further includes a method for accessing digital content on demand. A request for the digital content is received from a unit in the multiple unit environment. The digital content is accessed from the server, and delivered to the unit. The delivery of the digital content is independent of any asynchronous delivery of other digital content to a second unit in the multiple unit environment.

Another aspect of the invention is provision for storing and using metadata about the content and about the user to aid in, for example, selecting or screening content.

The foregoing and other features, objects, and advantages of the invention will become more readily apparent from the following detailed description, which proceeds with reference to the accompanying drawings.

BRIEF DESCRIPTION OF THE DRAWINGS

FIG. 3 shows examples of content metadata associated with the digital content.

FIG. 4 shows examples of user metadata associated with a user profile.

FIG. 15 shows examples of a custom product billing rate table, which stores custom billing rates for products in the digital content.

FIG. 16 shows examples of a product discount table, which stores discounts that can be applied to products in the digital content.

DETAILED DESCRIPTION

Figure 1:
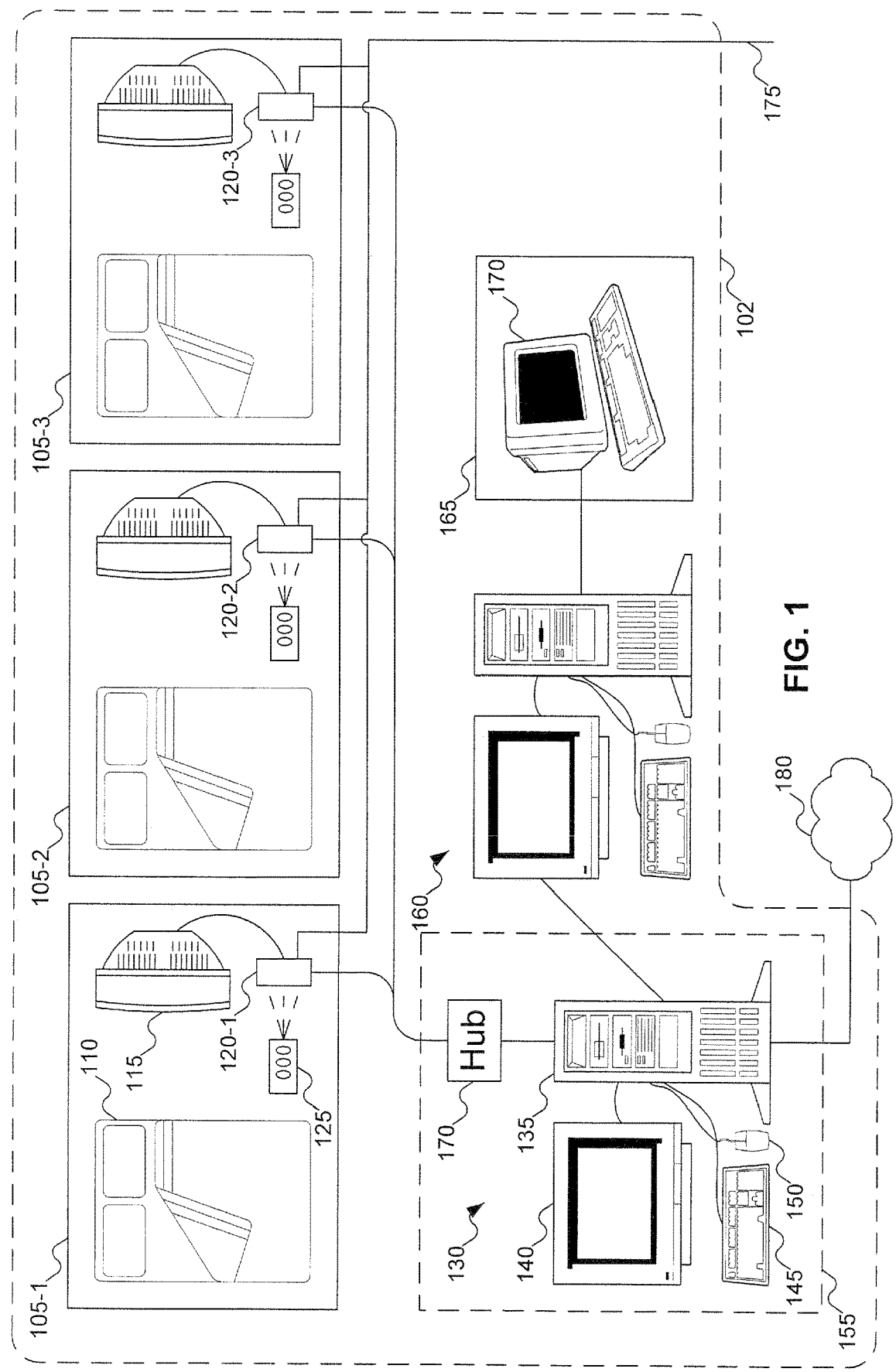
FIG. 1 shows a multiple unit environment equipped to provide digital content to the units according to the preferred embodiment of the invention.

FIG. 1 shows a multiple unit environment equipped to provide digital content to the units according to the preferred embodiment of the invention. In FIG. 1, environment 102 is a multiple unit environment. Typically, environment 102 will be a hotel, but a person skilled in the art will recognize that other types of environments exist. For example, environment 102 can be a hospital, or a "cyber cafe," or any other place where people gather and might want access to digital content. Throughout this document, for purpose of example, environment 102 is assumed to be a hotel. A person skilled in the art will recognize how the description herein can be modified for other environments.

Within environment 102 are units 105-1, 105-2, and 105-3. (A person skilled in the art will recognize that, although only three units are shown for exemplary purposes, there can be more or fewer units in environment 102.) As environment 102 is assumed to be a hotel room, unit 105-1 includes bed 110, television 115, set-top box 120-1, and remote control unit 125. Units 105-2 and 105-3 and any additional units are similarly equipped. A guest can use remote control unit 125 to select desired content via set-top box 120-1 for display on television 115. (Not shown in FIG. 1 is a computer terminal in each unit, which can also be used for display of desired content. Such a computer terminal can also be used to control access to the desired content, taking over the duties of set-top boxes 120-1, 120-2, and 120-3.)

Although units 105-1, 105-2, and 105-3 are shown with set-top boxes 120-1, 120-2, and 120-3, respectively, a person skilled in the art will recognize that set-top boxes 120-1, 120-2, and 120-3 can be avoided. For example, the functionality of set-top box 120-1 (to select the desired content) can be handled through television 115. Where television 115 incorporates the functionality of set-top box 120-1, television 115 includes circuitry to transmit information identifying the user's desired content, selected using remote control unit 125. When the desired content is identified and selected, a signal can be sent from television 115 (for example, along a coaxial cable) to the source of the desired content (discussed below). But in the preferred embodiment, set-top box 120-1 is used to select the desired content.

Server 130 stores the digital content. Server 130 typically includes computer 135, monitor 140, keyboard 145, and mouse 150. A person skilled in the art will recognize that server 130 might not include all of the components shown as part of server 130, as needed. Optional equipment for server 130 not shown in FIG. 1 can include a printer and other input/output devices. Also not shown in FIG. 1 are the conventional internal components of server 130: e.g., a central processing unit, memory, file system, etc.

Server 130 stores digital content that is made available to units 105-1, 105-2, and 105-3. The digital content is delivered to set-top box 120-1 (and thence to television 115) through hub 170, which can switch delivery of the digital content to the appropriate destination. Server 130 is preferably kept in secure room 155, to prevent unauthorized access to the digital content. The digital content is accessible to users only through hub 170.

Although most people think of movies when they hear the term digital content-on-demand (and this is the primary form of digital content), other forms of digital content are possible. For example, as discussed below, access to an internetwork is a form of digital content. Video games can also be digital content, as can computer software access. The remainder of this document will focus primarily on movies, but a person skilled in the art will recognize how the description herein can be adapted to other forms of digital content.

An additional use for the invention is to enable a user to access his bill. For example, one of the options presented to the user via set-top box 120-1 can be a current summary of the user's charges. The information is accessed from billing system 160 and routed to television 115, enabling the user to view his current bill.

As discussed above, set-top box 120-1 is not a necessary element for controlling the selection of content. If signals are sent from television 115 to server 130 (for example, through a coaxial cable), hub 170 is not needed either, since the content does not need to be switched to its appropriate destination.

Server 130 is also connected to billing system 160. Billing system 160 tracks the access of content by users, so that the users are properly billed for their accesses. Billing system 160 is accessed by terminal 170, used by the hotel management when a guest checks out. that way, any charges incurred by the guest can be presented to the guest on his bill at checkout time.

Server 130 preferably is also connected to internetwork 180, allowing users to access resources over internetwork 180. As with other digital content, access to internetwork 180 can be permitted for a fee, which is forwarded to billing system 160 to be added to the user's bill.

The digital content stored on server 130 can be updated in several ways. The preferred way to update the digital content stored on server 130 is via internetwork 180. When new content becomes available, it is transferred over internetwork 180 to server 130. This can be accomplished using either "push" technology or "pull" technology. Using "push" technology, the new digital content is sent to server 130 when it becomes available. In "pull" technology, server 130 periodically checks to see if new digital content is available, and retrieves the new digital content to update the digital content stored on server 130. Alternatively, new digital content can be delivered using a physical medium, such as digital video disc (DVD) or compact disc (CD). Once access to secure room 155 is achieved, the contents of the physical medium can be transferred to server 130 and the old digital content erased.

One concern is to protect the digital content. Where the new digital content is delivered on a physical medium, security is relatively easy to achieve. But where the new digital content is retrieved electronically, either by "push" technology or "pull" technology, security is preferably accomplished by encrypting the digital content.

There are several ways to encrypt the new digital content. Two methods are preferred. One method involves encrypting the new digital content as is delivered. In this case, the new digital content is stored offsite from environment 102 in an encrypted state. As the new digital content is delivered to server 130 (either by "push" technology or "pull" technology), the transport stream is encrypted. Upon receipt by server 130, the data stream is decrypted, and the new digital content is stored on server 130 unencrypted. A person skilled in the art will recognize that encryption can similarly be used to secure the delivery of the digital content from server 130 to units 105-1, 105-2, and 105-3, if desired.

The other method involves encrypting the new digital content before it is delivered. The digital content is encrypted, and the encrypted file is stored on a server offsite from environment 102. The encrypted digital content is delivered and stored on server 130 (either "pushed" or "pulled"). The new digital content can be decrypted at this point, storing an unencrypted file on server 130, or it can be left encrypted. If the new digital content file is stored encrypted, it can be delivered encrypted to units 105-1, 105-2, and 105-3, where it can be decrypted. Alternatively, the new digital content can be stored unencrypted, and can be encrypted again for delivery to units 105-1, 105-2, and 105-3, if desired.

Although the primary use of set-top box 120-1 is to provide access to the digital content from server 170, set-top box 120-1 can provide additional functionality. For example, set-top box 120-1 can allow a user to access services normally available to users (such as cable television, for which no charge is generally incurred). Set-top box 120-1 preferably has connections for these other inputs, such as a coaxial-cable connection for coaxial cable 175.

Figure 2:
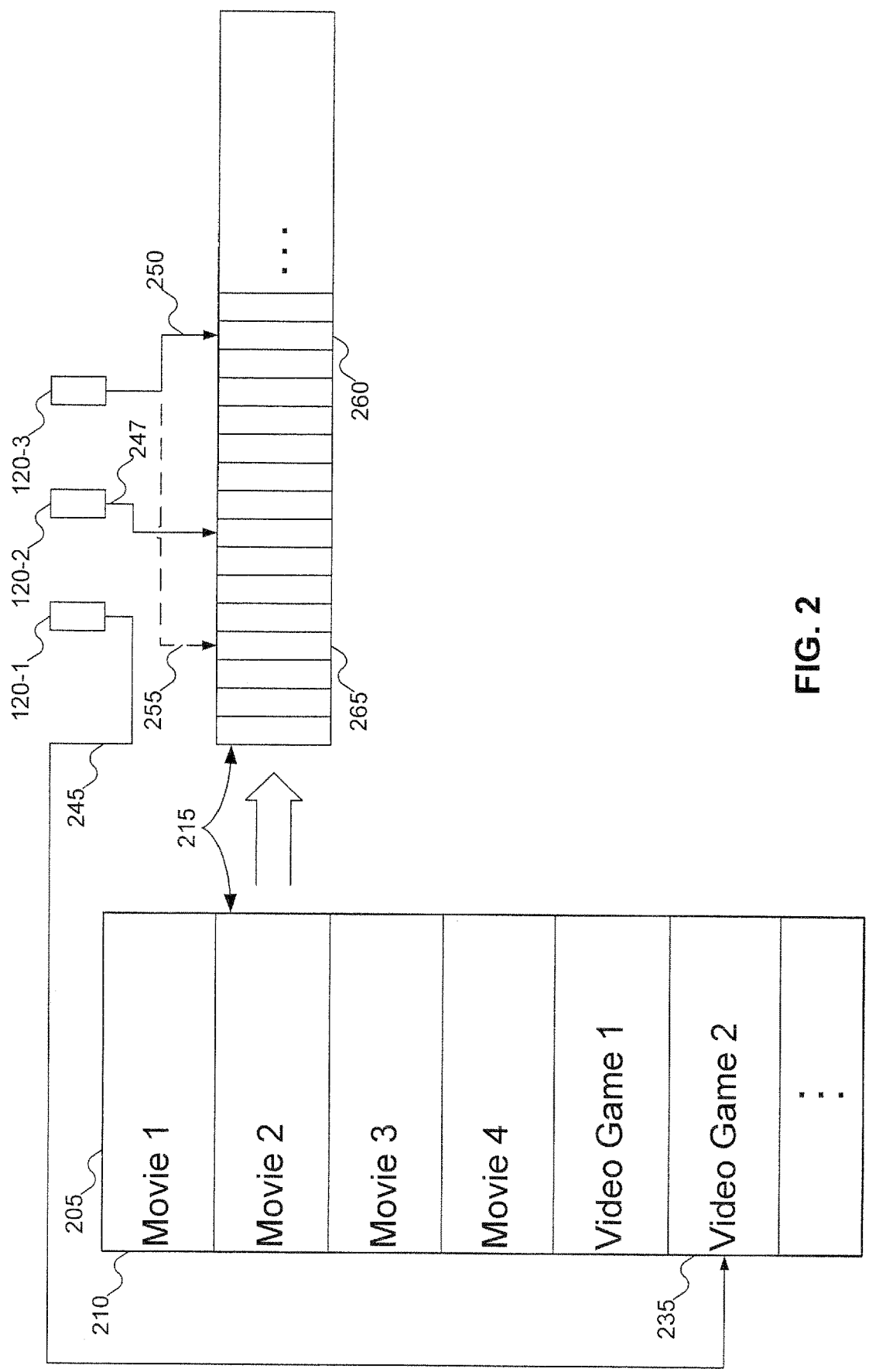
FIG. 2 shows multiple units accessing digital content in the environment of FIG. 1.

FIG. 2 shows multiple units accessing digital content in the environment of FIG. 1. In FIG. 2, digital content 205 includes, among others, four movies (including movies 210 and 215) and two video games (including video game 235). Each of set-top boxes 120-1, 120-2, and 120-3 can access all the different types of digital content 205. For example, set-top box 120-1 is accessing video game 235 (shown by line 245), whereas set-top boxes 120-2 and 120-3 are accessing movie 215 (shown by lines 247 and 250, respectively). Note that, although set-top boxes 120-2 and 120-3 are both accessing movie 215, they are currently at different points in movie 215, and have independent control over their viewing of movie 215. Thus, if the user using set-top box 120-3 needs to reverse playback to watch a scene again (shown by dashed line 255), he can accomplish this without affecting playback through set-top box 120-2. Or the user using set-top box 120-3 can elect to reverse playback of movie 215 (i.e., play movie 215 backwards at normal speed), a tool that is useful, for example, in digital editing. In the preferred embodiment, users have limited control to repeat portions of digital content 205, which can be limited to, say, 30 seconds worth of review, or to pause playback. This prevents users from avoiding payment when watching a movie a second time. However, a person skilled in the art will recognize that playback controls do not have to be so limited.

Another way the user using set-top box 120-3 can change position within the file is by selecting a different chapter. If movie 215 includes chapter information, the user can access the chapter information and select a particular chapter, jumping to the location within movie 215 represented by the selected chapter. In the preferred embodiment, users are limited in their ability to select earlier chapters within digital content 205, again to prevent users from repeating a movie without paying for a second viewing.

When a user uses remote control unit 125 (see FIG. 1) to control playback of digital content 205, the effect is to alter the accessing of the file storing the selected digital content. Since each file in digital content 205 is stored as a conventional file on server 130, each file includes a number of blocks. When the blocks are accessed in the correct order, the digital content of the file is accessed serially. For example, when a user pauses playback with remote control unit 125, access to the current block of the digital content file is temporarily suspended. When the user resumes playback, the block where the user suspended playback is once again accessed. When a user rewinds playback, an earlier block in the digital content file is accessed. For example, dashed line 255 shows the user controlling set-top box 120-3 rewinding movie 215. The access point in the file is changed from block 260 to block 265 to rewind the file. Users can move forward through the digital content file in a similar manner.

FIG. 3 shows examples of content metadata associated with the digital content. In FIG. 3, movie 215 is shown with associated content metadata 303. Content metadata 303 includes information about the digital content file (in this case, movie 215). For a movie, such information can include the Motion Picture Association of America (MPAA) rating 310, genre 315 (type of movie), and default billing rate 320. For a video game, content metadata 303 can include a rating of the level of violence, whether the video game is from the first-person perspective, etc. A person skilled in the art will recognize that the examples of content metadata presented in FIG. 3 are only exemplary, and that other types of metadata can be included.

By making default billing rate 320 part of content metadata 303, each type of digital content 205 can be assigned a different default rate. In the preferred embodiment, digital content files are also grouped into categories, and each category is assigned a default billing rate. This combines the fine-tuned control possible when each digital content file is assigned its own default billing ratewith the ability to charging a default billing rate for an entire category of digital content files at once. When a digital content file has a default billing rate assigned to it and the category to which the digital content file also has a default billing rate, the billing rate assigned to the digital content file has priority.

The preferred embodiment of the invention also provides for custom billing rates, which override the default product and category billing rates. For example, a movie studio may request that all of their movies be priced lower for one month, to encourage their movies being viewed. There are two types of custom billings rates: one associated with products and one associated with product categories. The two types operate similarly, so only the custom product billing rate will be described here. (Where there are both custom product billing rates and custom product category billing rates, the custom product billing rate takes priority over the custom product category billing rate.)

FIG. 15 shows an example of custom product billing rate table 1505, which stores the custom product billing rates. Custom product billing rate 1510, as an example, associates rate key 1515 with a number of digital content files, represented by product IDs 1520-1, 1520-2, and 1520-3. For any given rate key, there can be as few as one associated product or as many as all the files in the digital content. Each product associated with the rate key, such as product ID 1520-2, has a price associated with it, such as price 1525. Each product can have a different price. Thus, a single rate key binds together any number of products, each with its own price. The rate keys are used as part of the user metadata (see with reference to FIG. 4, below).

The same key can be used as both a custom product billing rate key and a custom product category billing rate key. But as discussed above, in that case the custom product billing rate key overrides the custom product category billing rate key.

The model described herein as the preferred embodiment is a complicated model, although very versatile. A person skilled in the art will recognize simpler models that can be used for custom pricing, such as including the custom price within content metadata 305.

FIG. 16 shows an example of product discount table 1605, which stores the discounts to be applied to products for customers. Product discount 1610, as an example, associates product discount key 1615 with a number of digital content files, represented by product IDs 1620-1, 1620-2, and 1620-3. For any given product discount key, there can be as few as one associated product or as many as all the files in the digital content. Each product associated with the product discount key, such as product ID 1620-2, has a discount associated with it, such as discount 1625. Discount 1625 is a percentage discount, but as can be seen, discounts can also be specified as a fixed amount. Each product can have a different discount. Thus, a single product discount key binds together any number of products, each with its own discount. The product discount keys are used as part of the user metadata (see with reference to FIG. 4, below).

Not shown in FIG. 16 is the product category discount table. The product category discount table operates similarly to product discount rate table 1605, and will not be further described herein, except that entries in product category discount table apply discounts to categories of digital content products, rather than to individual products.

The same key can be used as both a product discount key and a product category discount key. Similarly, there can be both fixed and percentage discounts applied to a product or category. In the preferred embodiments, all discounts are taken from all possible discount keys, although within each key, percentage discounts are calculated before applying a fixed discount. Thus, for example, if a digital content file has a price of $10.00 and both a 10% discount and a $1.00 discount, the final price is $10.00−10%−$1.00=$8.00.

FIG. 4 shows examples of user metadata associated with a user profile. User profile 402 (discussed further with reference to FIG. 5 below) includes user metadata 403. As in FIG. 3, the types of user metadata 403 included exemplary only, and other types of metadata can be included. User metadata 403 includes information such as maximum MPAA rating 410 and disliked movie genres 420.

User profile 402 can also include billing rate key 425. When provided, billing rate key 425 overrides the default price for the product (whether selected from the product or the product category). The entry corresponding to billing rate key 425 is accessed to see if there is a custom billing rate (either product billing rate or product category billing rate) for the product. If the product is listed in the entry for billing rate key 425, the associated price is selected as the price for the product. Otherwise, the default price for the product or product category is applied.

In FIG. 4, billing rate key 425 has been updated from a rate key of "1" to a rate key of "2." This can change the amount the user to whom user profile 402 is assigned is billed for watching a movie. For example, rate key "1" might not have a custom price for the product, in which case the user is billed at the default rate for the digital content. But rate key "2," as shown in FIG. 15, can indicate that the user is to be billed at a custom billing rate.

FIG. 4 also shows discount rate key 430. If present, the appropriate discount rate entry is located within product discount table. If the product selected by the consumer is included in the discount rate entry, the appropriate discount can be applied to the customer's bill. For example, discount rate key 430 specifies rate key 3. Referring to FIG. 16, in rate key 3, movie 2 is discounted by 10%. This discount can then be applied to the price otherwise charged for movie 2.

Figure 5:
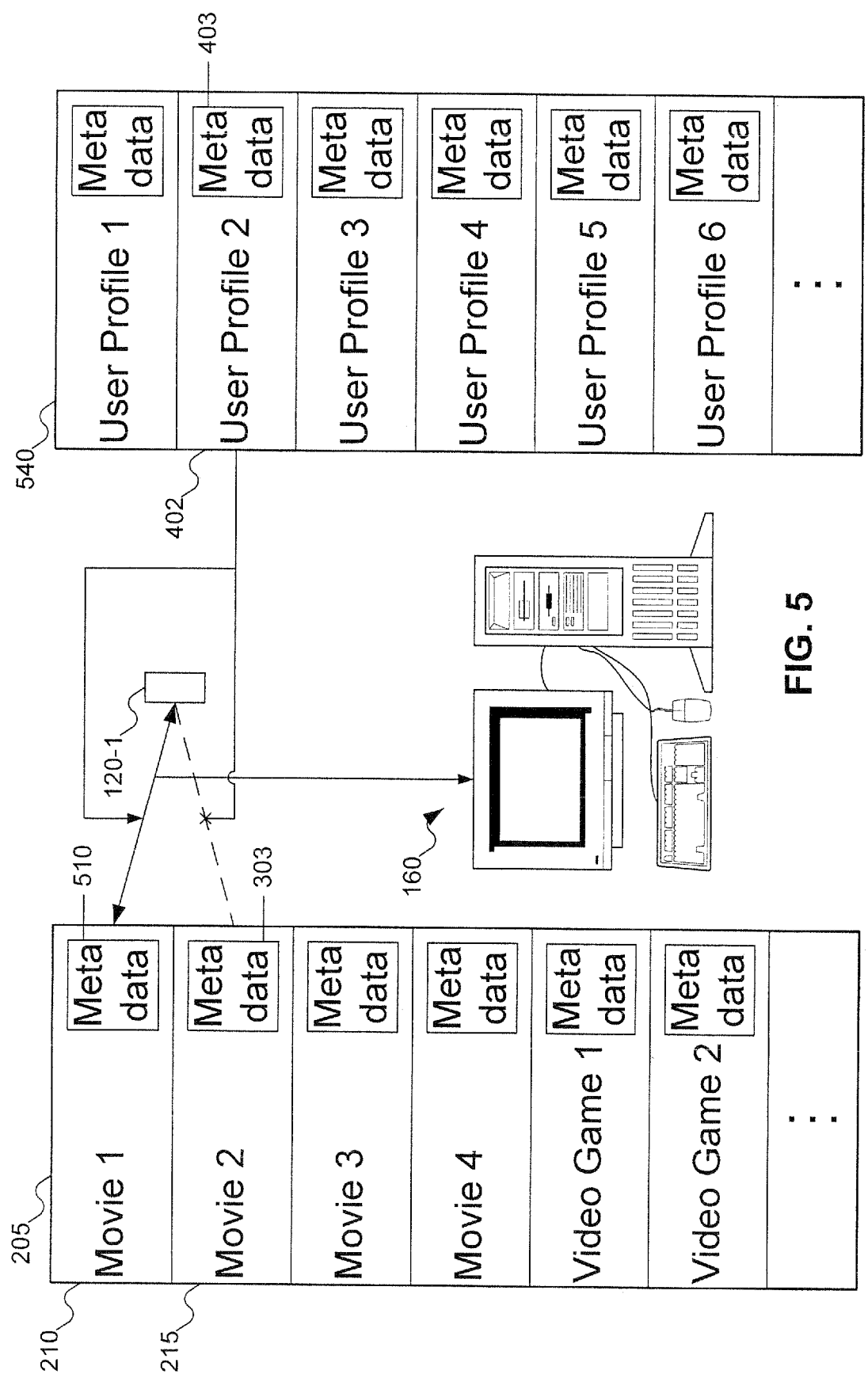
FIG. 5 shows the interaction of user profiles and digital content to control conditional access to the digital content and to report access to the billing system in the environment of FIG. 1.

FIG. 5 shows the interaction of user profiles and digital content to control conditional access to the digital content and to report access to the billing system in the environment of FIG. 1. In FIG. 5, the user of set-top box 120-1 is choosing a movie to watch. Assume for purposes of the discussion of FIG. 5 that movie 210 is an action movie, whereas movie 215 is a science fiction movie. The user's profile is user profile 402, drawn from user profile set 540. User profile 402 includes user metadata 403. Recall from FIG. 4 that user metadata 403 specifies a dislike for science fiction movies. When listing available movies for the user to watch, the content metadata of each movie in digital content 205 interacts with user metadata 403. Because user metadata 403 indicates a dislike of science fiction movies and movie 215 is a science fiction movie, the system can skip presentation of movie 215 to the user, and instead present only movie 210. (Of course, the user can override user metadata 403 to see all available movies, even ones the user generally dislikes.) Although described herein in terms of only two movies, the foregoing process applies, and becomes increasingly advantageous, to large selections of movies of many different types.

Now assume that the user elects to watch movie 210. The system checks user metadata 403 to determine the user's billing rate key. Then, the appropriate billing rate is selected from content metadata 510 (or from the category metadata, if billing rates are determined from the category). This information is then forwarded to billing system 160 as shown, so that the user's bill can be updated to reflect the selection of a movie.

Figure 6:
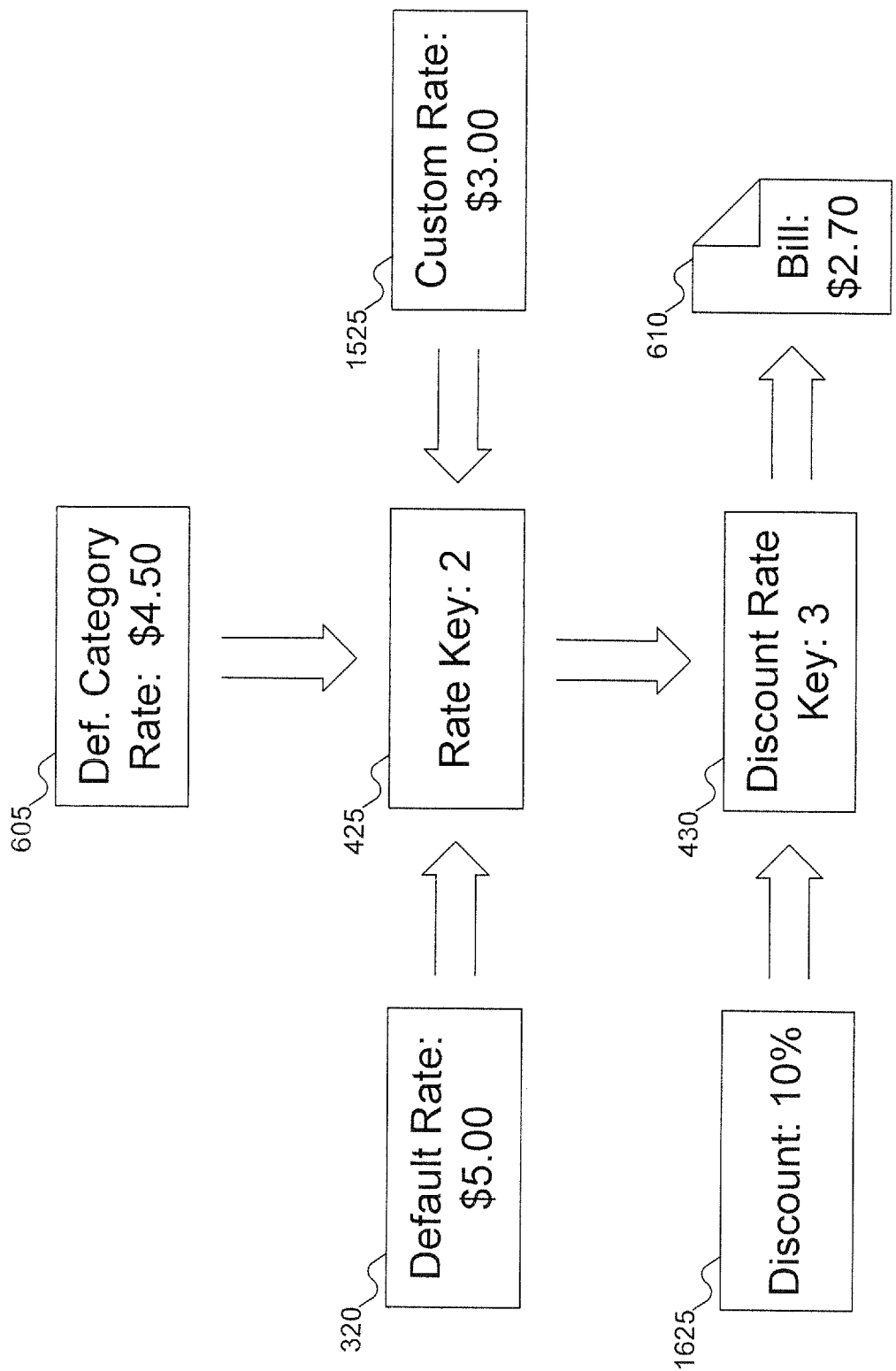
FIG. 6 shows how a bill is generated in the billing system of FIG. 5.

FIG. 6 shows how a bill is generated in the billing system of FIG. 5. First a billing rate is selected. There are four possible sources of billing rates: a default product billing rate (such as default billing rate 320), a default product category billing rate (such as default product category rate 605), a custom product billing rate (such as custom product billing rate 1525), and a custom product category billing rate. As discussed above, custom billing rates override default billing rates, and product billing rates are preferred over product category billing rates. Once a billing rate is selected (in FIG. 6, custom product billing rate 1525 is selected based on billing rate key 425), a discount can be applied, if the user metadata includes a discount rate key. Since the user metadata includes discount rate key 430, product discount table 1605 and the product category discount table are accessed to determine the appropriate discount. In FIG. 6, discount 1625 can be applied. As discussed above, taking a discount is preferably an option determined by the user metadata. However, a person skilled in the art will recognize that discounts can be given for other reasons. For example, a discount can be made available by the hotel to "encourage" patrons to select less popular movies in the digital content. Once the discount is applied, if offered, the final amount is added to the user's bill 610.

Figure 7:
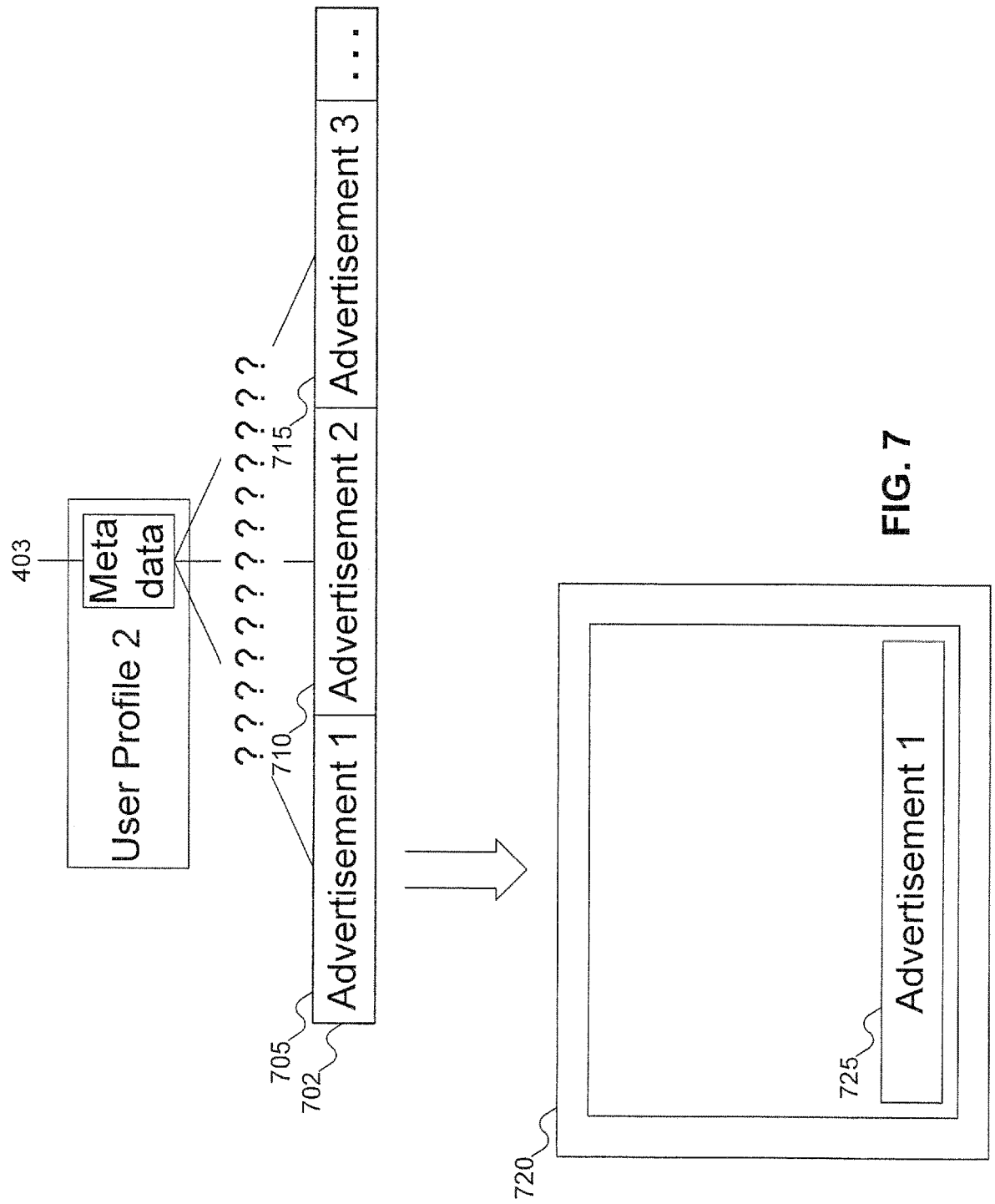
FIG. 7 shows how advertisements are selected for display to a user in the environment of FIG. 1.

FIG. 7 shows how advertisements are selected for display to a user in the environment of FIG. 1. User metadata 403 is compared with a variety of advertisements stored in the system. In FIG. 7, advertisement table 702 stores three advertisements 705, 710, and 715 that are compared with user metadata 403. The advertisement that best matches user metadata 403 (in FIG. 7, advertisement 705) is then selected for presentation to the user. In FIG. 7, advertisement 725 is displayed to the user on monitor 720. Although FIG. 7 shows only one advertisement being presented to the user, a person skilled in the art will recognize that multiple advertisements can match user metadata 403, and all can be presented to the user.

That advertisements can be selected based on user metadata allows marketing campaigns to be customized for each user. For example, based on the airline flown by the user, special deals offered by the airline can be selected for display to the user. Or business affiliates (such as a long-distance telephone company) can be advertised, offering frequent flyer miles to the user for signing up. A person skilled in the art will recognize other ways advertising can be used to customize a marketing campaign for each user.

Figure 8:
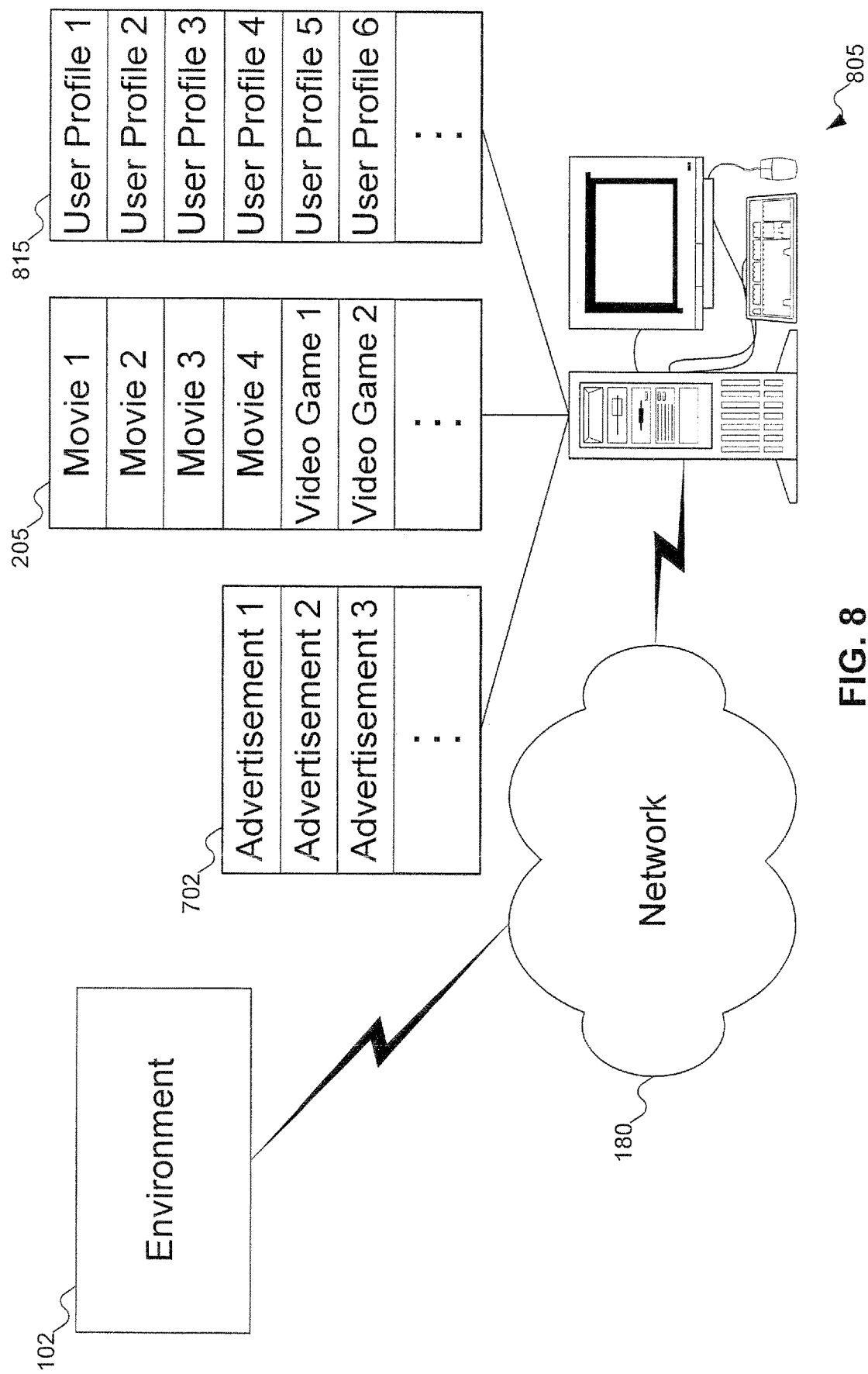
FIG. 8 shows the digital content, advertisements, and user profiles stored offsite from the environment of FIG. 1 for delivery to the server local to the environment.

FIG. 8 shows the digital content, advertisements, and user profiles stored offsite from the environment of FIG. 1 for delivery to the server in the environment. As described with reference to FIG. 1, user profiles 815 can be stored within environment 102. But user profiles 815 can also be stored offsite, in remote server 805. Storing the user profiles offsite makes possible a user taking advantage of the system from different environments. Thus, as a user stays at different hotels during different trips, his profile is retrieved from server 805 by each hotel, allowing each hotel to tailor its digital content delivery to the user's preferences.

As discussed above with reference to FIG. 1, digital content 205 can be delivered to server 130 in several ways. In the preferred embodiment, digital content 205 is stored in remote server 805 and delivered to local server 130 within environment 102 electronically, over an internetwork. This obviates the need for physical delivery of digital content 205, saving expense. This also enables environment 102 to update digital content 205 at the most convenient time, rather than when new digital content 205 is delivered.

Similarly, advertisements 702 can be stored in server 805, and retrieved by server 130 at environment 102 when it is time to display an advertisement to a user. Advertisements 702 can still be tailored to services local to environment 102 by selecting from different advertisements that match the user's profile but are local to environment 102.

Figure 9:
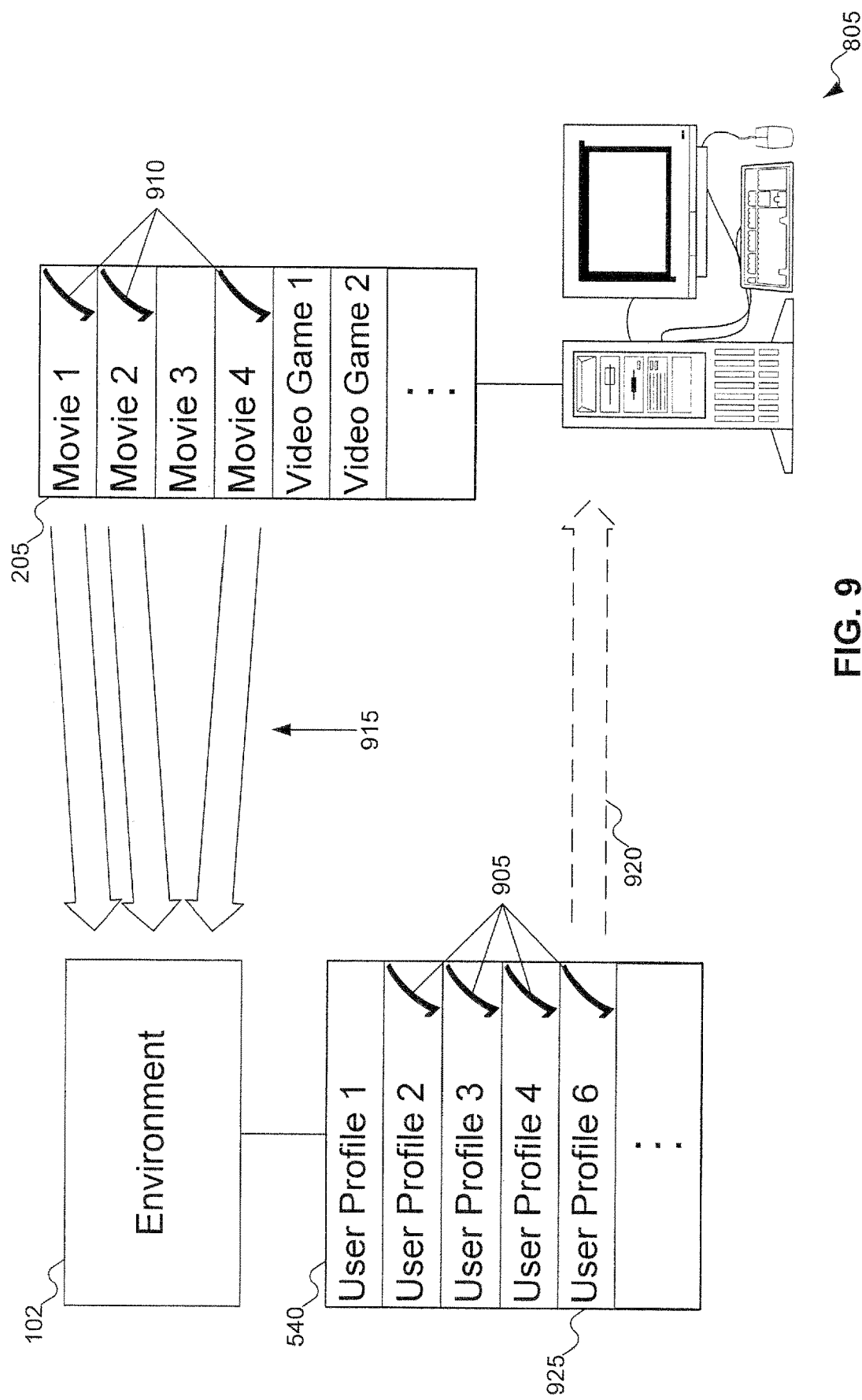
FIG. 9 shows digital content that matches user profiles in the environment of FIG. 1 being delivered to the environment.

FIG. 9 shows digital content that matches user profiles in the environment of FIG. 1 being delivered to the environment. In FIG. 9, a number of user profiles from user profile set 540 are accessed at roughly the same time within environment 102. (How closely in the time the profiles need to be accessed is a customizable feature. A typical interval might be within a single calendar day, which suggests a number of guests registering for an event, such as a convention.) A statistically significant percentage of the accessed user profiles include a particular metadata element, represented in FIG. 9 by check mark 905. For example, the accessed user profiles might include metadata indicating a preference for science fiction movies. A person skilled in the art will recognize that the user profiles can have other metadata in common. The invention can then locate digital content 205 that matches the common metadata element, as shown by check mark 910 in FIG. 9. For example, in FIG. 9, movies 1, 2, and 4 might be science fiction movies, which guests at a science fiction convention would favor. The invention then "pushes" digital content 205 that matches the common metadata element, as shown by arrows 915. Then, when the guests look at the available choices of digital content, environment 102 will show more science fiction choices than might otherwise be available.

What constitutes a "statistically significant" percentage of accessed user profiles depends on environment 102 and is customizable. It is not reasonable to expect that 100% of the access user profiles will have a particular metadata element in common. But at some point the number of accessed user profiles with the common metadata element exceeds coincidence. For example, in a hotel with 300 rooms, having 30 guests with a preference for science fiction movies is probably not significant. But when 240 guests have a preference for science fiction movies, something is out of the ordinary.

When user profiles are stored offsite, as described above with reference to FIG. 8, updated information can be returned to offsite server 805 for later retrieval. This is shown in FIG. 9 by arrow 920. For example, if user profile 925 is updated to reflect that user profile 925 receives a discount on digital content, this information can be transmitted back to offsite server 805. Then, when user profile 925 is next accessed, even if in a different environment, the discount will be available to the user.

Figure 10:
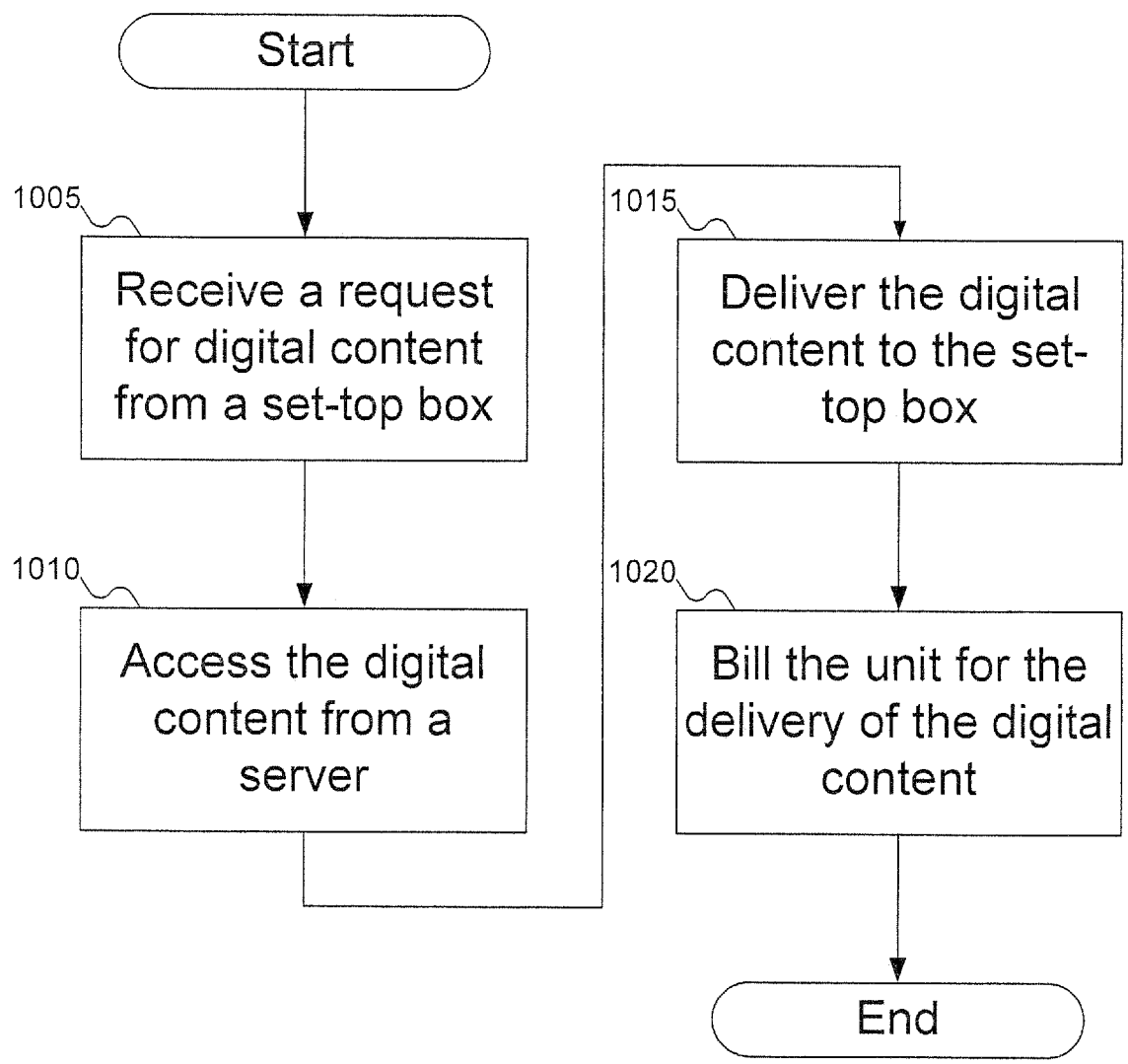
FIG. 10 flowcharts the procedure used to retrieve digital content and deliver it to a unit in the environment of FIG. 1.

FIG. 10 flowcharts the procedure used to retrieve digital content and deliver it to a unit in the environment of FIG. 1. At step 1005, the invention receives a request for digital content. In the preferred embodiment, this request comes from a set-top box, but as discussed above, the set-top box can be eliminated and the signal can come from the television. At step 1010, the digital content is accessed. At step 1015, the digital content is delivered to the set-top box. And at step 1020, the unit is billed for the delivery of the digital content.

Figure 11:
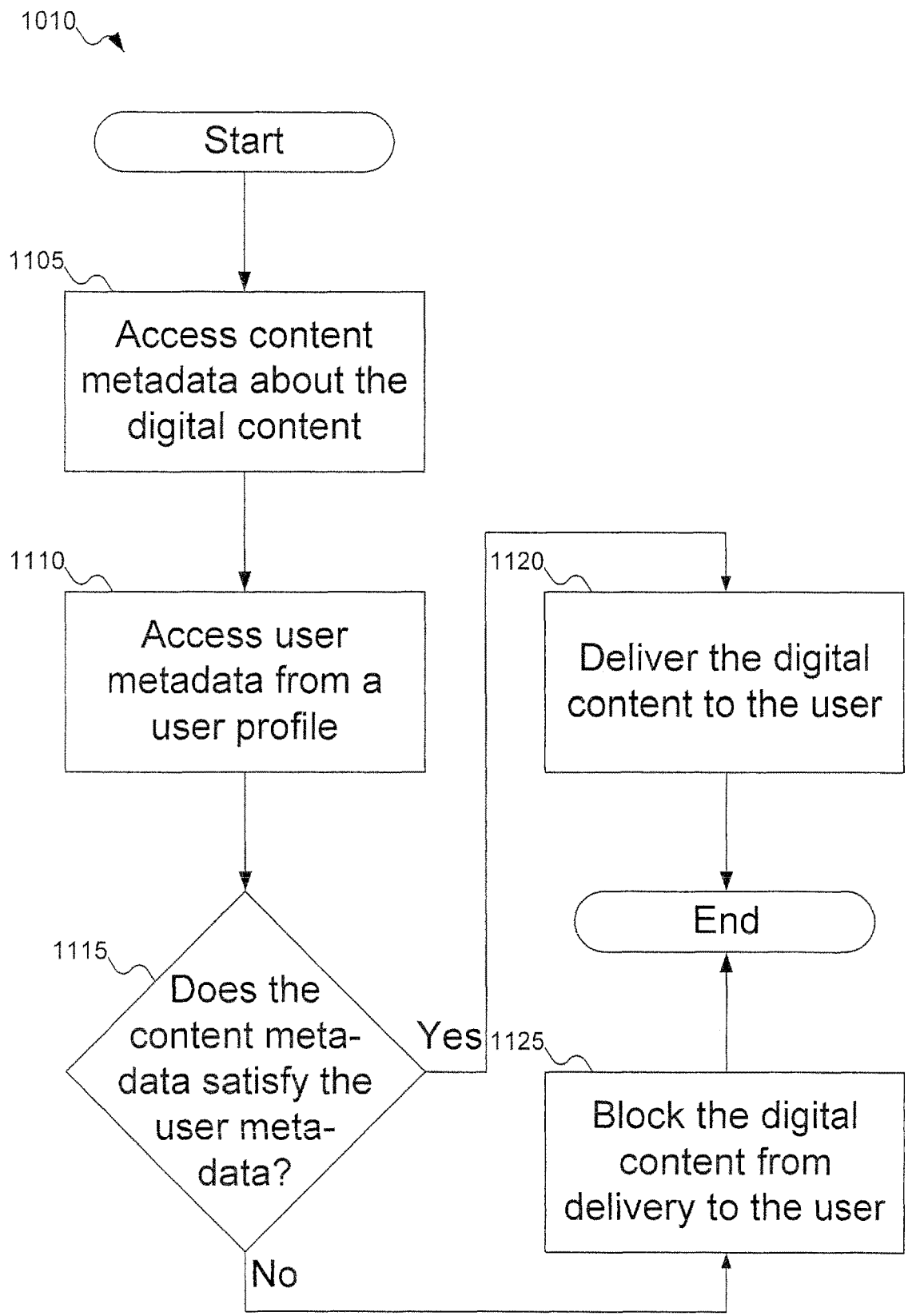
FIG. 11 flowcharts the procedure used to conditionally access digital content in the flowchart of FIG. 10.

FIG. 11 flowcharts the procedure used to conditionally access digital content in the flowchart of FIG. 10. In FIG. 11, at step 1105, content metadata about the digital content is accessed. At step 1110, user metadata is accessed from the user profile. At step 1115, the content metadata is compared with the user metadata to determine if the content metadata satisfies the user metadata. For example, if the user metadata includes a filter that no movies with a rating higher than "PG-13" be presented to the user, then to satisfy the user metadata a movie must have a rating of "PG-13" or less. If the content metadata satisfies the user metadata, then at step 1120 the digital content is delivered to the user. Otherwise, at step 1125, the digital content is blocked from delivery to the user.

Figure 12A:
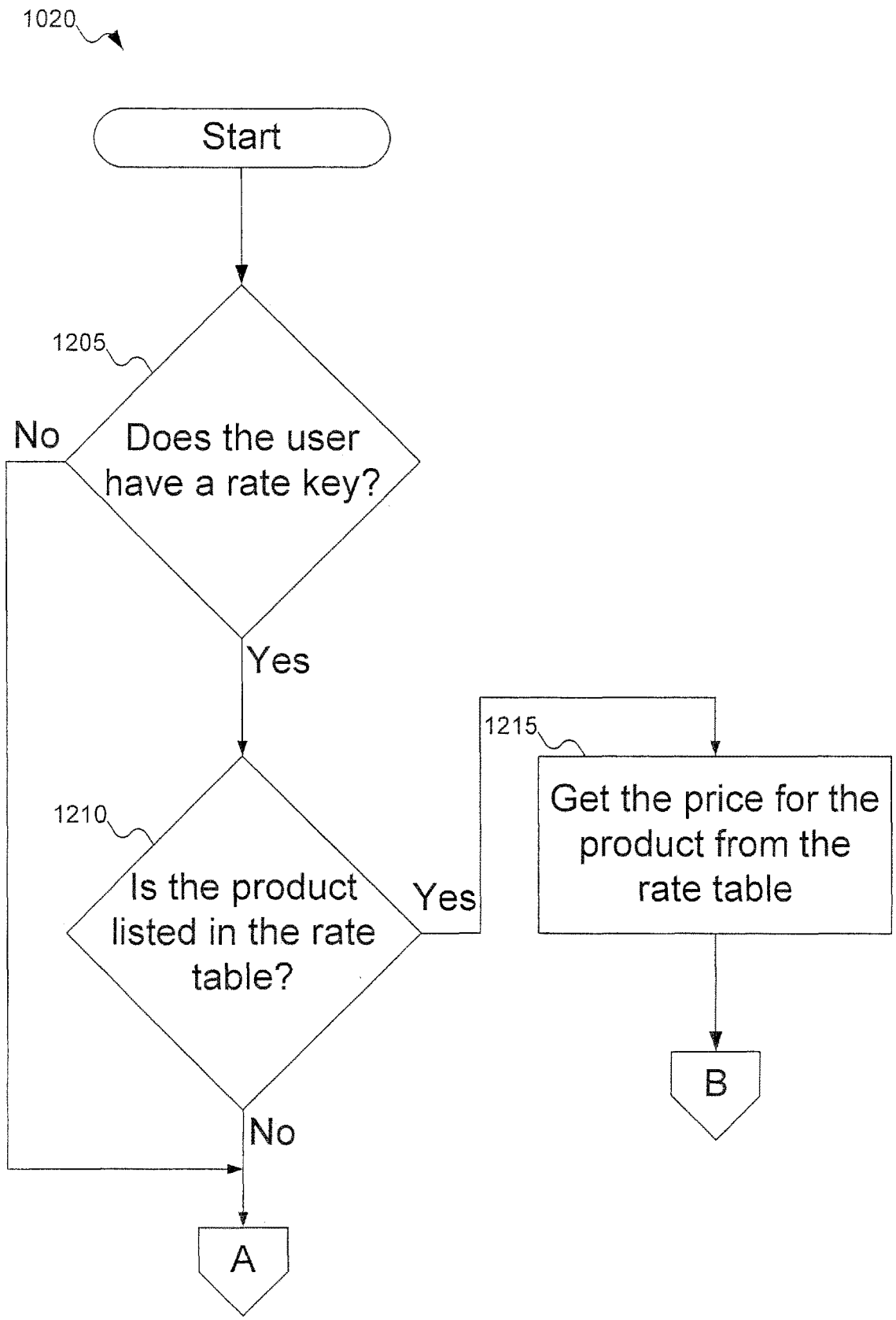
FIGS. 12A-C flowchart the procedure used to bill a user in the environment of FIG. 1.
Figure 12B:
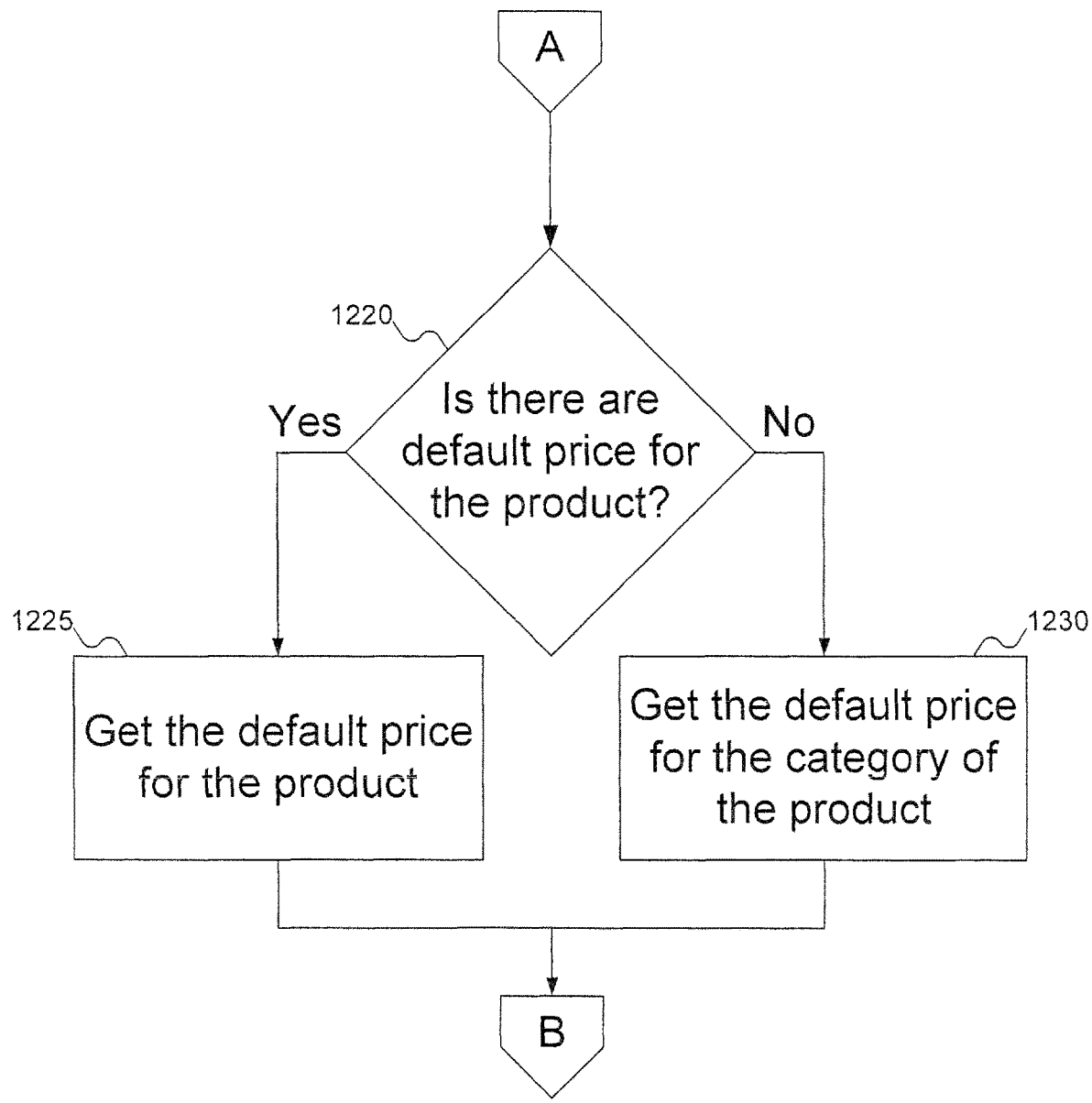
Figure 12C:
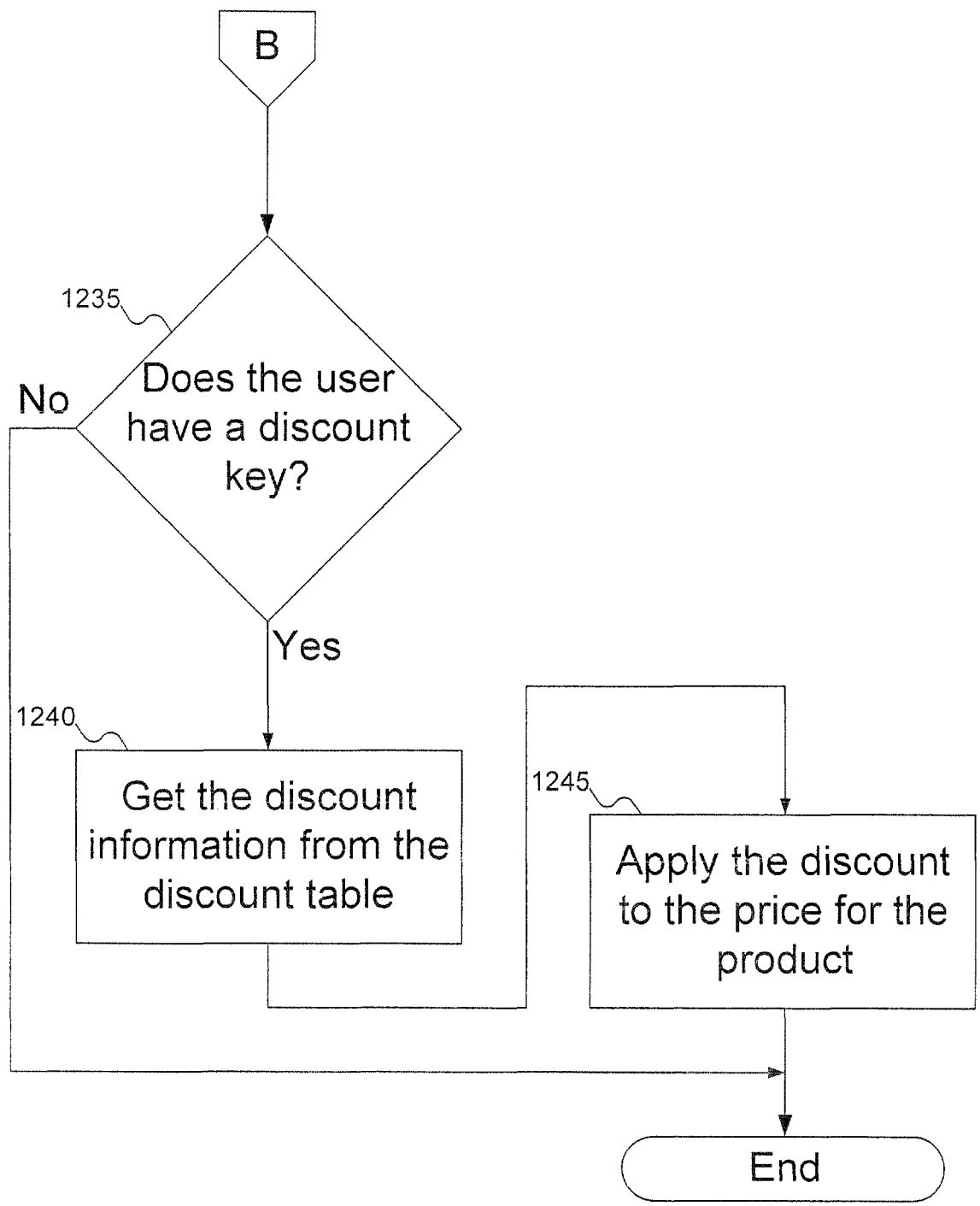

FIGS. 12A-C flowchart the procedure used to bill a user in the environment of FIG. 1. At step 1205 the user metadata is checked to see if the user has a rate key. If he does, then at step 1210 the product is checked to see if it has a rate in the rate table. If it does, then at step 1215 the price is drawn from the rate table for product.

If either the user does not have a rate key or the product does not have a rate in the rate table, then at step 1220 the product is checked to see if it has a default price. If it does, then at step 1225 the price for the product is drawn from the default price. Otherwise, at step 1230, the price for the product is taken from the default price for the category in which the product falls.

Regardless of the source of the price for the product, at step 1235 the user metadata is checked to see if the user a discount key. If the user has a discount key, then at step 1240 the discount information is drawn from the discount table, and at step 1245 the discount is applied to the price for the product.

Figure 13:
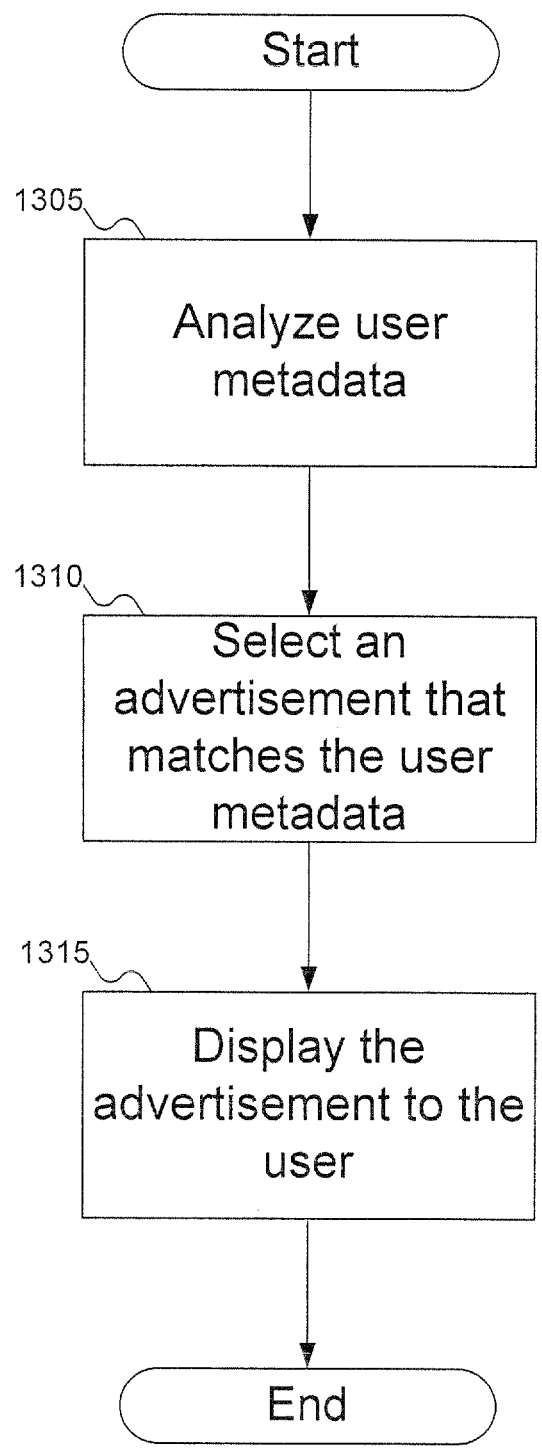
FIG. 13 flowcharts the procedure used to display advertisements to a user in the environment of FIG. 1.

FIG. 13 flowcharts the procedure used to display advertisements to a user in the environment of FIG. 1. At step 1305, the user metadata is analyzed. At step 1310, an advertisement is selected that best matches the user metadata. As discussed above with reference to FIG. 7, more than one advertisement can be selected. Finally, at step 1315, the selected advertisement is displayed to the user.

Figure 14:
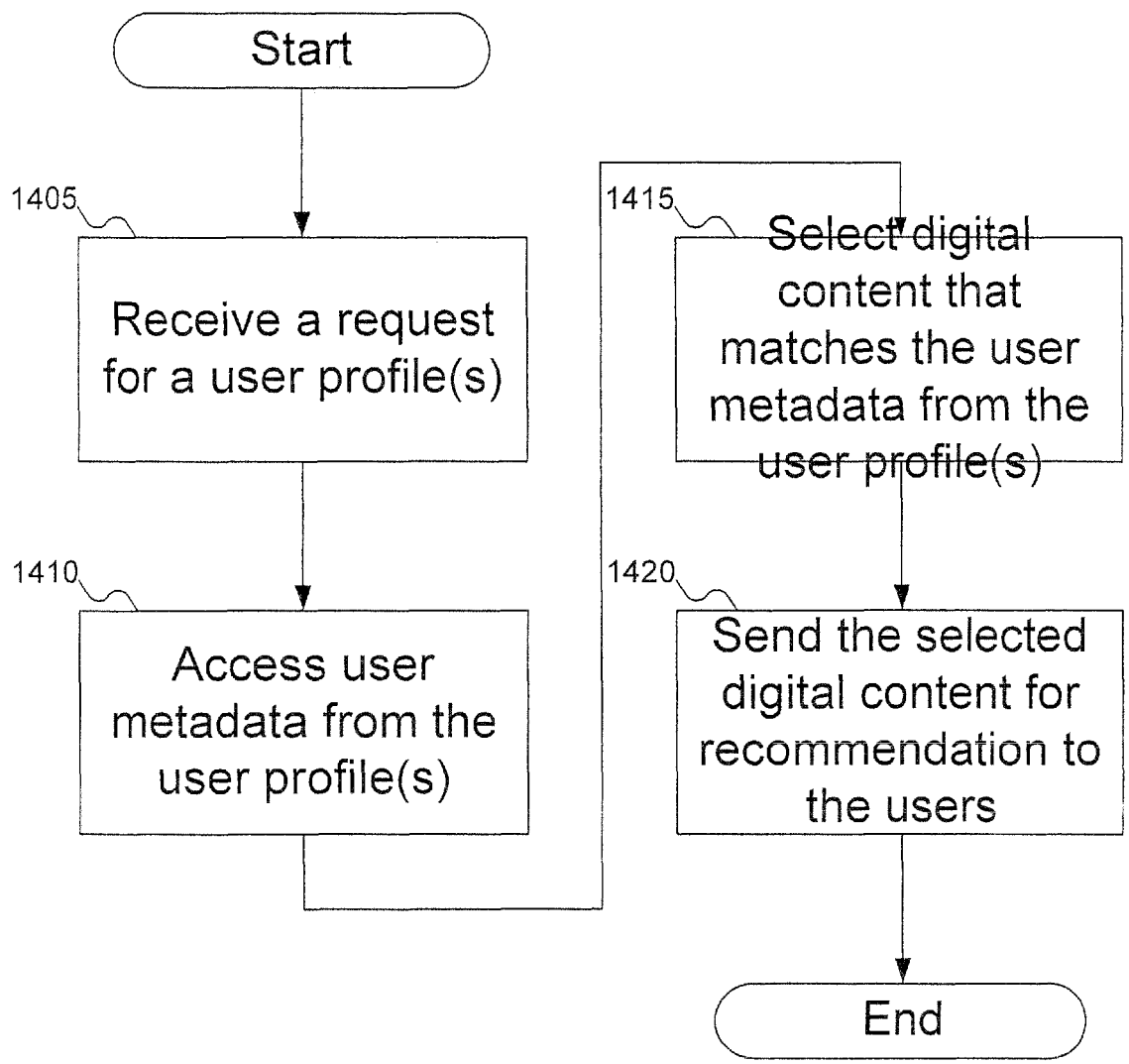
FIG. 14 flowcharts the procedure used to deliver digital content to the environment of FIG. 1 expected to be desired by users.

FIG. 14 flowcharts the procedure used to deliver digital content to the environment of FIG. 1 expected to be desired by users. At step 1405, user profiles are requested. At step 1410, the user metadata from the user profiles are accessed. At step 1415, digital content that matches the user metadata is selected. At step 1420, the selected digital content is sent to the users as recommendations for digital content.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

The invention claimed is:

1. A method of delivering digital content on demand comprising:
    employing an on-site server to check for availability of new digital content;
    pushing the new digital content to the on-site server when the new digital content becomes available electronically, or pulling the new digital content electronically to update previous digital content stored on the on-site server, the on-site server located at one of a plurality of multiple-unit environments;
    registering a user in one of the plurality of multiple-unit environments;
    retrieving a user profile associated with the user from an off-site server situated a distance from the plurality of multiple-unit environments;
    presenting on demand digital content to the user in response to the user profile;

storing content metadata associated with the on demand digital content, related to a rating, a genre, and at least one default rate or category rate;

comparing a user metadata stored in the user profile with the content metadata associated with the on demand digital content;

providing conditional access to the user of the on demand digital content when the content metadata satisfies the user metadata;

displaying the on demand digital content to the user in response to the user profile, the on demand digital content associated with the content metadata related to a rating, a genre, and at least one default rate or category rate;

equipping a user access system with one or more playback controls to be used by the user for selectively viewing different portions of the on demand digital content and configuring the one or more playback controls to prevent the user from a repeated viewing of the on demand digital content without being billed for the repeated viewing;

equipping the user access system to display one or more advertisements matching to the user metadata in order to allow marketing campaigns to be customized for the user;

billing the user for the on demand digital content in response to the user profile;

accessing a billing rate key in the user profile;

billing the user for the on demand digital content at a rate selected from among the default rate, the category rate, and one or more custom rates in response to the billing rate key in the user profile; and, accessing a current summary of user charges billed to the user according to the billing rate key by the user in one of the plurality of multiple-unit environments.

2. The method of claim 1, further comprising:

retrieving digital content from the off-site server based on the user profile; and storing the retrieved digital content on the on-site server located at one multiple-unit environment.

3. The method of claim 2, further comprising:

presenting the retrieved digital content to the user from the on-site server located at one multiple-unit environment.

4. The method of claim 2, further comprising:

retrieving digital content from the off-site server based on services local to the one multiple-unit environment.

5. The method of claim 1, further comprising:

updating the user profile;

transmitting the updated user profile to the off-site server.

6. The method of claim 5, further comprising:

registering the user in a second one of the multiple-unit environments;

retrieving the user profile associated with the user in the second one of the multiple-unit environments from the off-site server; and presenting digital content to the user in the second one of the multiple-unit environments in response to the user profile.

7. At least one non-transitory machine readable medium containing processor readable code for programming one or more processors to perform a method comprising the steps of:

employing one or more on-site servers to check for availability of new digital content;

pushing the new digital content to the one or more on-site servers when the new digital content becomes available electronically, or pulling the new digital content electronically to update previous digital content stored on the one or more on-site servers; the one or more on-site servers located at a plurality of multiple-unit environments;

registering a user in at least one of the plurality of multiple-unit environments;

retrieving a user profile associated with the user from at least one off-site server situated a distance from the plurality of multiple-unit environments;

presenting on demand digital content to the user in response to the user profile;

storing content metadata associated with the on demand digital content, related to a rating, a genre, and at least one default rate or category rate;

comparing a user metadata stored in the user profile with the content metadata associated with the on demand digital content;

providing conditional access to the user of the on demand digital content when the content metadata satisfies the user metadata;

displaying the on demand digital content to the user in response to the user profile, the on demand digital content associated with the content metadata related to a rating, a genre, and at least one default rate or category rate;

equipping a user access system with one or more playback controls to be used by the user for selectively viewing different portions of the on demand digital content and configuring the one or more playback controls to prevent the user from a repeated viewing of the on demand digital content without being billed for the repeated viewing;

equipping the user access system to display one or more advertisements matching to the user metadata in order to allow marketing campaigns to be customized for the user;

billing the user for the on demand digital content in response to the user profile;

accessing a billing rate key in the user profile;

billing the user for the on demand digital content at a rate selected from among the default rate, the category rate, and one or more custom rates in response to the billing rate key in the user profile; and, accessing a current summary of user charges billed to the user according to the billing rate key by the user in one of the plurality of multiple-unit environments.

8. The at least one non-transitory machine readable medium of claim 7, further comprising:

retrieving digital content from the at least one off-site server based on the user profile;

storing the retrieved digital content on the one or more on-site servers.

9. The at least one non-transitory machine readable medium of claim 8, further comprising:

retrieving digital content from the at least one off-site server based on services local to the at least one multiple-unit environment;

updating the user profile; and transmitting the updated user profile to the at least one off-site server.

* * * * *